United States Patent [19]

Ukai et al.

[11] Patent Number: 4,504,728
[45] Date of Patent: Mar. 12, 1985

[54] ARC WELDING ROBOT CONTROL SYSTEM

[75] Inventors: Jun Ukai; Hirohisa Segawa, both of Komaki; Haruki Ando, Nagoya, all of Japan

[73] Assignee: Mitsubishi Denki Kabushiki Kaisha, Tokyo, Japan

[21] Appl. No.: 411,483

[22] Filed: Aug. 25, 1982

[30] Foreign Application Priority Data

Aug. 31, 1981 [JP] Japan .................. 56-136616

[51] Int. Cl.³ .................. B23K 9/12; B23K 9/10
[52] U.S. Cl. .................. 219/125.1; 901/42
[58] Field of Search .......... 219/130.5, 137 PS, 125.1, 219/124.22, 76.14; 901/42

[56] References Cited
U.S. PATENT DOCUMENTS 4,224,501  9/1980  Lindbom et al. .............. 219/125.1
4,301,355  11/1981 Kimbrough et al. ......... 219/137 PS

OTHER PUBLICATIONS

T. Lyman, Ed., *Metals Handbook*, vol. 6, 1971, p. 94.

Primary Examiner—Clifford C. Shaw
Attorney, Agent, or Firm—Wenderoth, Lind & Ponack

[57] ABSTRACT

An arc welding robot control system includes a control console where a plurality of points on a workpiece taught by a teaching box and a welding voltage, a welding current and a welding speed set by a key board to be specified to each of the taught points are stored in a central control unit and displayed on a cathode ray tube, and a welding electric source for selectively delivering two sets of a welding voltage and a welding current which are specified for a pulsed and a short arc welding process respectively. With the pulsed arc welding process displayed, a set of normally open contacts disposed within the central control unit is closed to cause an electromagnetic contactor disposed within the welding source to operate the source with the that process. Otherwise the contact set is maintained open to operate the source with the short arc welding process.

12 Claims, 6 Drawing Figures

ARC WELDING ROBOT CONTROL SYSTEM

BACKGROUND OF THE INVENTION

This invention relates to improvements in an arc welding robot control system employing the so-called point-to-point teaching, computer controlled playback system in which there are stored a plurality of points and a robot is automatically moved to pass through the stored points one after another for automatically effecting the arc welding.

A conventional arc welding robot control system has comprised an arc welding robot including the main body provided at the extremity with a welding torch, a control console and a teaching box. The teaching box has taught a plurality of points through which the welding torch passes successively on the particular workpiece and the attitude of the welding torch relative to the workpiece at each of the taught points one after another. The control console has included a central control unit in which the taught points and attitude of the welding torch are stored along with the welding conditions such as a welding voltage, a welding current etc. in one section defined by each pair of adjacent taught points, those welding conditions being set by a key board disposed in the control console and displayed on a cathode ray tube also disposed in the latter. The control console has been connected to the main robot body and a welding electric source which is, in turn, connected to both a feed reel for feeding a welding wire to the welding torch and the workpiece. The welding torch has responded to command signals from the central control unit in the control console to successively pass through the taught points to effect the arc welding on the workpiece.

There have been recently developed welding electric sources of the type enabled to selectively carry out a plurality of types welding process, for example, the pulsed and short arc welding processes only through the operation of a switching element disposed therein.

Also workpieces have increased each of which includes portions having different weld quality or which require complicated welding attitudes. The welding of those workpieces gives the better result by changing one to the other of the pulsed and short welding processes as required.

However conventional arc welding robot control systems such as described above have been unable to specify the types of welding process resulting in the disadvantage that the welding is forcibly effected according to an unsuitable one of the types of welding process, alternatively, that the particular welding is divided into two steps each of which is executed according to that type of welding process suited thereto.

Accordingly it is an object of the present invention to provide a new and improved arc welding robot control system including means for selecting the types of welding process by a teaching box or a key board disposed therein whereby the automatic arc welding is continuously effected according to that type of welding process most suitable for each of portions into which an associated workpiece is divided in order to specify the types of welding process to those portions.

SUMMARY OF THE INVENTION

The present invention provides an arc welding robot control system for automatically moving a welding robot to pass through a plurality of points stored therein one after another, comprising a welded workpiece; a welding electric source having a plurality of sets of a welding voltage and a welding current each specified to a different one of the plurality types of welding process, the welding electric source controlling the feed of a welding wire fed toward the workpiece and selectively supplying the plurality of sets of the welding voltage and the welding current across the workpiece and the welding wire, a switching element for changing the welding electric source to deliver the set of the welding voltage and the welding current specified to a desired one of the types of welding process; a central control unit for storing therein the plurality of the types of welding processes in correspondence with the plurality of the points when the points are stored in the central control unit, the central control unit supplying to the welding robot signals for automatically moving the welding robot to pass through the plurality of stored points one after another and also selectively applying to the switching element signals corresponding to the types of welding processes stored therein; input means for entering positional data of the points and the types of welding process into the central control unit; and display means for selectively displaying the positional data of the points and the types of welding processes entered into the central control unit by the input means.

In a preferred embodiment of the present invention, the plurality of the types of welding processes may include a pulsed arc welding process and a short arc welding process, and the switching element may include a set of contacts disposed on the central control unit to be put in its closed position with the pulsed arc welding process and an electromagnetic contactor disposed on the welding electric source to change the latter to be operative with the pulsed arc welding process in response to the closure of the set of contact disposed on the central control unit.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
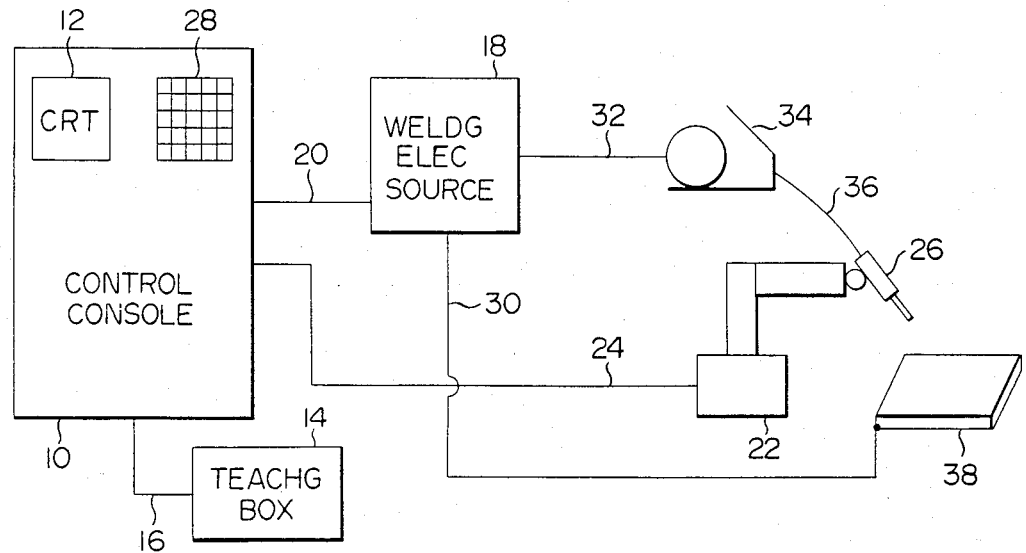
FIG. 1 is a schematic side elevational view of a conventional arc welding robot apparatus with a part illustrated in perspective.

Referring now to FIG. 1 of the drawings, there is schematically illustrated a conventional arc welding robot apparatus controlled according to the so-called point-to-point teaching, computer controlled playback system. The arrangement illustrated comprises a control console 10 including a cathode ray tube 12 and a teaching box 14 connected to the control console 10 through a connecting cable 16. The control console 10 applies various arc welding conditions such as a welding voltage, a welding current etc. to a welding electric source 18 through a connecting cable 20 and command signals to a main body 22 of a robot through connecting cable 24. The main robot body is disposed to be spaced from the control console 10 and includes a welding torch 26 movably mounted to a movable arm extending from the extremity thereof and a driving device (not shown) for driving the welding torch 26.

The welding electric source 18 is connected via a power cable 30 to a welded workpiece 32 on the one hand and connected via power cable 32 to a welding feed reel 34 on the other hand. The welding feed reel 34 supplies a welding wire 36 to the welding torch 26 under the control of the welding electric source 18.

Thus the welding electric source 18 supplies a welding voltage and a welding current as determined by the central control unit to the welding torch 26 and the workpiece 38 through the power cable 32 and the welding wire 36 on the one hand and the power cable 30 on the other hand whereby the arc welding is effected on that portion of the workpiece 32 put directly under the extremity of the welding torch 26.

Figure 2:
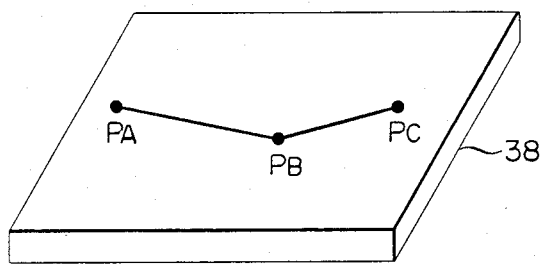
FIG. 2 is a perspective view of a workpiece having shown on the surface thereof a welding path along which a welding is effected.
Figure 3:
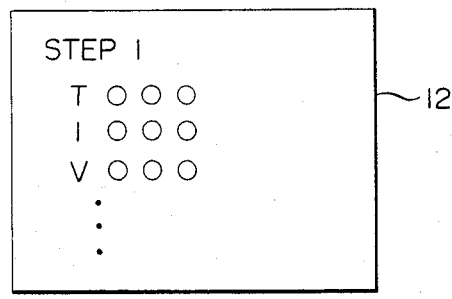
FIG. 3 is a plan view of the display panel of a cathode ray tube shown in FIG. 1 and indicating a display in the conventional manner thereon.

It is assumed that, as shown in FIG. 2, the particular arc welding is effected on the surface of the workpiece 38 along a welding path represented by a segment of a straight line extending between a point $P_A$ and a point $P_B$ in the step 1 and then another welding path represented by another segment of a straight line extending between the point $P_B$ and a point $P_C$ to form an angle between the same and the firstmentioned welding path in the next succeeding step. Under the assumed conditions the teaching box 14 teaches to a central control unit (not shown) disposed on the control console 10 positional data of the points $P_A$, $P_B$ and $P_C$ and an attitude of the welding torch 26 relative to the workpiece 38 at each of those points. At the same time the key board 28 is operated to set and teach a time T of movement of the torch 26 (or a speed of movement thereof), a welding current I and a welding voltage V between the points $P_A$ and $P_B$ and those between the points $P_B$ and $P_C$ to the central control unit in the control console 10. Those taught data are stored in the central control unit in the control console 10 while at the same time they are displayed on the cathode ray tube 12, as shown in FIG. 3. FIG. 3 shows data T, I and V in the step 1 only for purposes of illustration.

The control console 10 and the teaching box 14 are described in more detail, for example, in U.S. patent application Ser. No. 356,153 filed on Mar. 8, 1982 by Haruki Ando and assigned to the same assigner as the present application. The pertinent portion of the cited application may be incorporated into the present specification for reference.

Then the welding torch 26 responds to successive command signals from the central control unit in the control console 10 to effect the arc welding on the workpiece 38 along the welding path as shown in FIG. 2 taught by the teaching box 14.

There have been recently developed welding electric sources of the type enabled to selectively carry out a plurality of types of welding process only through the operation of a switch disposed within the same. In other words, the welding electric sources of the type referred to can selectively provide a plurality of sets of a welding voltage and a welding current each specified to a different one of the types of welding process. For example, there has been known welding electric sources of the type enabled to selectively supply to associated welding torch and workpiece a set of a welding voltage and a welding current specified for a pulsed arc welding process and that specified for a short arc welding process only through the operation of a switch disposed within the same.

With such a type of welding electric sources used, the features of those two welding processes have been utilized to effect a welding suited to the weld quality required for the particular workpiece. For example, the pulsed arc welding process is suited to workpieces requiring weld beads having a beautiful appearance without any scatter and those requiring the fillet weld having equal legs and others. Also the short arc welding is suited to workpieces required to be small in both thermal strain and heat affected zone and those into which the associated welding torch is not entered unless a very large advance angle is provided.

Also welding robots are frequently used to effect the welding of workpieces each including portions required to have different weld qualities and those requiring complicated welding attitudes. For welding of such workpieces the welded products have given the good result by changing one to the other of the pulsed and short arc processes as required.

However conventional arc welding robot control systems have been unable to specify the welding process. This has resulted in the disadvantage that the welding is forcibly effected according to a welding process unsuited thereto, alternatively, that a welding process is divided into two steps thereby to effect the welding in accordance with welding processes suited to the steps respectively.

The present invention contemplates to eliminate the disadvantages of the prior art practice as described above by the provision of means for changing one to another of a plurality of types of welding process enabled by an associated welding electric source by a teaching box or a key board involved.

Figure 4:
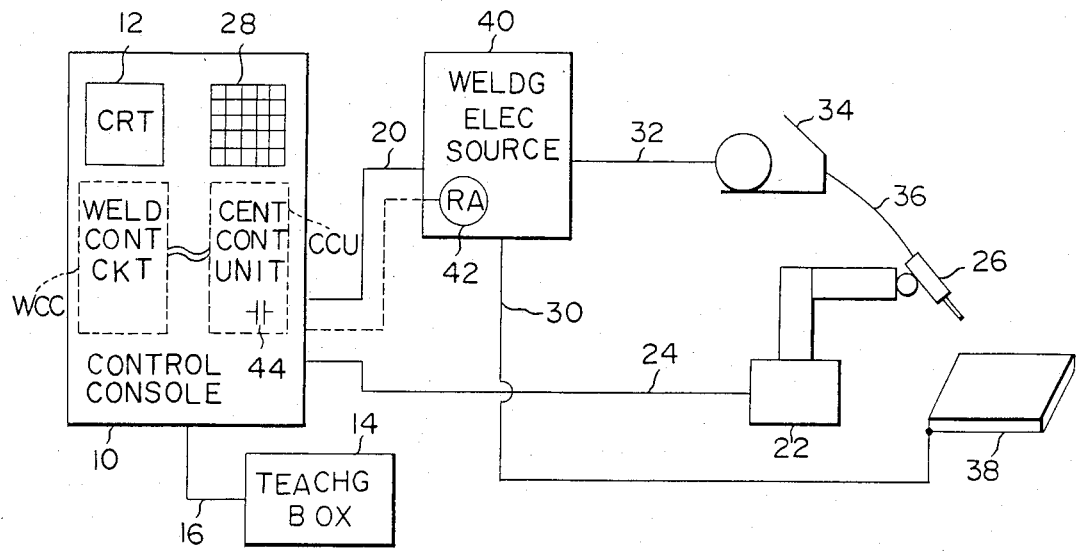
FIG. 4 is a schematic side elevational view of one embodiment according to the arc welding robot control system of the present invention with a part illustrated in perspective.

In FIG. 4 wherein like reference numerals designate the components identical to those shown in FIG. 1, there is schematically illustrated one embodiment according to the arc welding robot control system of the present invention. The arrangement illustrated is different from that shown in FIG. 1 only in that in FIG. 4 the welding electric source 18 shown in FIG. 1 is replaced by a welding electric source 40 enabled to selectively provide a plurality of sets of a welding voltage and a welding current each specified for a different type of welding process, in this case, a pulsed and a short arc welding process, an electromagnetic contactor 42 disposed within the welding electric source 40 to change from one to the other of the pulsed and short arc welding processes and a set of contacts 44 disposed within control console 10 to be closed during the pulsed arc welding process. The set of contacts 44 is connected to the electromagnetic contactor 42 as shown at dotted line in FIG. 4.

In FIG. 4 the control console 10 is also shown as including a central control unit CCU provided with the set of contacts 44 and a welding control circuit WCC connected to the central control unit.

The welding electric source 40 is used, for example, with a welding machine commercially available under CLEANMAG Welder PN350B from Mitsubishi Denki Kabushiki Kaisha. Alternatively the welding source 40 may be commercially available under TRANSISTERC MM350 from Osaka Henatsuki Kabushiki Kaisha.

Figure 5A:
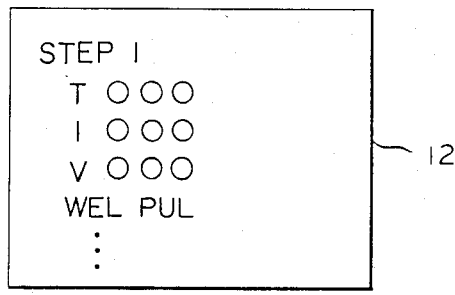
FIGS. 5A and 5B are plan views of the display panel of a cathode ray tube shown in FIG. 4 and indicating different displays according to the present invention respectively.

It is assumed that the pulsed arc welding process is used in the step starting with the point $P_A$ and terminating at the point $P_B$ and the short arc welding process is used in the step 2 starting with the point $P_B$ and terminating at the point $P_C$ (see FIG. 2). Under the assumed conditions, the teaching box 14 is first operated to effect the teachings and storing concerning the step 1 in the manner as described above in conjunction with FIG. 1 after which the key board 28 is operated to select the welding process to teach the pulsed arc welding process to the central control unit CCU in the control console 10. Then the process as described above is repeated with the step 2 excepting that the short arc welding process is selected in the step 2. Thus, as shown in FIG. 5A which is different from FIG. 3 only in that in FIG. 5A the specified arc welding process is additionally shown, the cathode ray tube 12 in the control console 10 indicates on its display panel that in the step 1 the pulsed arc welding process has been selected as the welding process in the step 1 (see "WEL PUL" shown in FIG. 5A). Simultaneously the set of contacts 44 is put in its closed position to energize the electromagnetic contactor 42. This energization of the electromagnetic contactors causes its set of normally open contacts (not shown) to be closed to change a control circuit (not shown) disposed within the welding electric source 40 to cause the welding electric source 40 to deliver the welding voltage and the welding current specified to the pulsed arc welding process across the welding torch 26 and the workpiece 38 resulting in the pulsed arc welding.

Figure 5B:
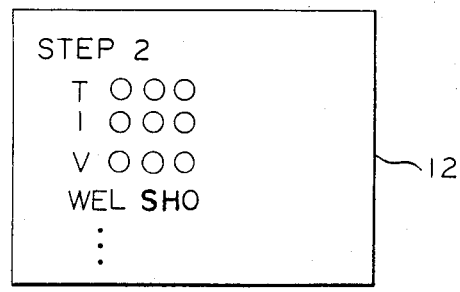

When the point $P_B$ is reached, the step 2 is initiated. At the same time the cathode ray tube 12 indicate that the short arc welding process has been selected as the welding process in the step 2 as shown in FIG. 5B which is different from FIG. 3 only in that in FIG. 5B the specified arc welding process is additionally shown (see "WEL SHO" shown in FIG. 5B). Also the set of contacts 44 is brought into its open position to deenergize the electromagnetic contactor 42 resulting in its set of now closed contacts being returned back to the open position. Thus the welding control circuit WCC in the control console 10 is changed so that the welding electric source 40 delivers across the welding torch 26 and the workpiece 38 the welding voltage and the welding current specified to the short arc welding process. This results in the short arc welding.

From the foregoing it is seen that, according to the present invention, a welding electric source suitable for selectively carrying out a plurality of types of welding proceses includes additionally a selecting element for selecting the types of welding process on the one hand and a control console has stored in a central control unit thereof the types of welding processes suited to sections between pairs of adjacent taught points through which the welding torch successively passes along with the welding conditions and others at each of the taught points and displayed them on the cathode ray tube, the arrangement being so that upon the movement of the robot a signal for selecting the stored types of welding processes from the central control unit is applied to the welding electric source to change the latter to be operative with the selected type of welding process to thereby continuously effect the automatic arc welding according to the type of welding process most suitable at that time for each portion of the workpiece. Thus, the present invention can increase the welding efficiency and improve the weld quality.

While the present invention has been illustrated and described in conjunction with a single preferred embodiment thereof it is to be understood that numerous changes and modifications may be resorted to without departing from the spirit and scope of the present invention. For example, the electromagnetic contactor 42 may be actuated with a voltage signal from the central control unit CCU but not by the set of contacts 44. Also the set of contacts 44 may be arranged to directly change the welding control circuit for the welding electric source 40 from one to another of the types of welding processes. Furthermore the teaching box 14 rather than the key board 28 may teach the types of welding processes to the central control unit CCU in the control console 10. In addition the cathode ray tube 12 may display the selected types of welding processes in a manner different from that shown in FIGS. 5A and 5B so long as the display on the cathode ray tube can be understood by the operator.

What is claimed is:

1. An arc welding robot control system for automatically moving a welding robot so as to pass through a plurality of points stored therein one after another, comprising a welded workpiece; a welding electric source for providing power for a plurality of different type of welding proceses, said source having a plurality of sets of a welding voltage and a welding current each specified for a different one of said plurality of types of welding processes, said welding electric source controlling the feed of a welding wire fed toward said workpiece and selectively supplying said plurality of sets of the welding voltage and the welding current across said workpiece and said welding wire, a switching element for changing said welding electric source so as to deliver the set of the welding voltage and the welding current specified for a desired one of said types of welding processes; a central control unit for storing therein said plurality of said types of welding processes in correspondence with said plurality of said points when said points are stored in said central control unit, said central control unit supplying to said welding robot signals for automatically moving said welding robot to pass through said plurality of said stored points one after another and also selectively applying to said switching element signals corresponding to said types of welding processes stored therein; an input means for entering positional data of said points and said types of welding processes into said central control unit; and a display unit for selectively displaying said positional data of said points and said types of welding processes entered into said central control unit by said input means.

2. An arc welding robot control system as claimed in claim 1, wherein said plurality of said types of welding processes includes a pulsed arc welding process and a short arc welding process.

3. An arc welding robot control system as claimed in claim 2, wherein said switching element includes a set of contacts disposed within said central control unit which is to be opened and closed in response to said types of welding processes stored in said central control unit and an electromagnetic contactor disposed within said welding electric source so as to change from one to another of said types of welding processes in response to the opening and closure of said set of contacts.

4. An arc welding robot control system as claimed in claim 3, wherein said set of contacts is closed during said pulsed arc welding process so as to energize said electromagnetic contactor.

5. An arc welding robot control system as claimed in claim 2, wherein said switching element comprises an electromagnetic contactor disposed within said welding electric source which is to be driven with a voltage signal from said central control unit so as to thereby change from one to another of the types of welding processes.

6. An arc welding robot control system as claimed in claim 2, wherein said switching element comprises a set of contacts disposed within said central control unit which is to be opened and closed in response to said types of welding processes so as to change a welding control circuit for said welding electric source.

7. An arc welding robot control system as claimed in claim 1, wherein said input means includes a key board for entering data into said central control unit and a teaching box connected to said central control unit through a connecting cable, said teaching box entering said positional data of said points into said central control unit.

8. An arc welding robot control system as claimed in claim 7, wherein said key board enters said types of welding processes into said central control unit.

9. An arc welding robot control system as claimed in claim 7, wherein said teaching box enters said types of welding processes into said central control unit.

10. An arc welding robot control system as claimed in claim 7, wherein a control console includes said central control unit, said key board and said display unit therein.

11. An arc welding robot control system as claimed in claim 10, wherein said display unit comprises a cathode ray tube.

12. An arc welding robot control system as claimed in claim 11, wherein said cathode ray tube displays said positional data of said points, a welding speed, said welding voltage, said welding current and said types of welding processes thereon.

* * * * *